(12) United States Patent
Murakami et al.

(10) Patent No.: US 7,793,584 B2
(45) Date of Patent: Sep. 14, 2010

(54) CHECK VALVE STRUCTURE OF HYDRAULIC DAMPER

(75) Inventors: Tomoharu Murakami, Tokyo (JP); Chikatoshi Abe, Tokyo (JP); Chikashi Imoto, Tokyo (JP); Hiroyuki Emoto, Tokyo (JP); Etsuro Nakada, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 413 days.

(21) Appl. No.: 11/889,284

(22) Filed: Aug. 10, 2007

(65) Prior Publication Data

US 2008/0035902 A1 Feb. 14, 2008

(30) Foreign Application Priority Data

Aug. 11, 2006 (JP) ............................... 2006-219447
May 28, 2007 (JP) ............................... 2007-140135

(51) Int. Cl.
*F16F 9/36* (2006.01)
*F16J 15/32* (2006.01)

(52) U.S. Cl. ..................................... 92/168; 188/322.17

(58) Field of Classification Search ....................... 92/86, 92/165 R, 168; 188/315, 322.13, 322.17
See application file for complete search history.

(56) References Cited

U.S. PATENT DOCUMENTS

| 4,189,033 | A | * | 2/1980 | Katsumori | ....................... 92/86 |
| 4,245,825 | A | * | 1/1981 | Ohtomo et al. | ............. 188/315 |
| 4,508,020 | A | * | 4/1985 | Szcupak | ....................... 92/168 |
| 4,527,673 | A | * | 7/1985 | Szcupak | ................. 188/322.17 |
| 4,542,811 | A | * | 9/1985 | Miura | ..................... 188/322.17 |
| 4,987,826 | A | * | 1/1991 | Deppert et al. | ............. 92/165 R |
| RE33,715 | E | * | 10/1991 | Miura | .................... 188/322.17 |
| 5,176,229 | A | | 1/1993 | Kanari et al. | |
| 5,178,243 | A | * | 1/1993 | Hamada et al. | ............ 92/165 R |
| 5,224,573 | A | * | 7/1993 | Amemiya et al. | .......... 92/165 R |
| 6,547,046 | B2 | * | 4/2003 | Yamaguchi et al. | ..... 188/322.17 |
| 6,622,832 | B2 | * | 9/2003 | Ashiba et al. | ................... 92/168 |
| 2002/0063024 | A1 | | 5/2002 | Ashiba et al. | |

FOREIGN PATENT DOCUMENTS

| JP | 57-127965 | | 8/1982 |
| JP | 5-45332 | | 6/1993 |
| JP | 9-317914 | | 12/1997 |
| JP | 11-108101 | | 4/1999 |
| JP | 11108101 | A * | 4/1999 |
| JP | 11-218244 | | 8/1999 |
| JP | 2002-257177 | | 9/2002 |
| JP | 2003-343633 | | 12/2003 |
| JP | 2005-240832 | | 9/2005 |

* cited by examiner

*Primary Examiner*—Thomas E Lazo
(74) *Attorney, Agent, or Firm*—Rabin & Berdo, PC

(57) ABSTRACT

There is provided a hydraulic damper including a receiving space formed between a rod guide of a cylinder and an insert metal, for temporarily retaining a working fluid leaked out from an oil chamber through a sliding gap of a rod. The hydraulic damper further includes a communicating path for communicating between a reservoir and the receiving space, and a check valve for allowing a flow of the working fluid only from the receiving space to the reservoir. Either one of a lip part of the check valve or a seat surface provided on the rod guide is formed with a sealing projected part protruding from a mutual contact surface.

8 Claims, 4 Drawing Sheets

US 7,793,584 B2

CHECK VALVE STRUCTURE OF HYDRAULIC DAMPER

TECHNICAL FIELD

The present invention relates to a check valve structure of a hydraulic damper.

BACKGROUND ART

In a hydraulic damper of a multi-cylinder type in general, a rod guide for respectively closing an opening end of a cylinder and an opening end of an outer cylinder enclosing the cylinder, and for supporting a rod inserted inside the cylinder in a freely slidable manner is provided. Further, a ring-shaped insert metal having sealing members to each of an inner periphery and an outer periphery thereof is layered on this rod guide so as to maintain oil tight property of the hydraulic damper.

In detail, the insert metal is provided with, at the outer periphery side thereof, a ring-shaped seal contacting against the inner periphery of the outer cylinder, and at the inner periphery side thereof, an oil lip and a dust lip slidably contacting with the outer periphery of the rod, so as to seal between the respective rod and the outer cylinder with the insert metal in the oil tight manner.

In such a hydraulic damper of a multi-cylinder type, since the sliding clearance between the rod and the rod guide is not in a perfectly sealed state, the working fluid from an oil chamber inside the cylinder flows into a receiving space between the rod guide and the insert metal through the sliding clearance although little by little. It is required to return this leaked working fluid to a reservoir inside the hydraulic damper, therefore, a communicating hole for communicating the receiving space and the reservoir is provided to the rod guide.

According to JP 2003-343633A, there has been proposed to provide a check valve for only allowing the flow of the working fluid from the receiving space towards the reservoir to prevent the reverse flow of the gas inside the reservoir to the oil chamber in the cylinder through this communicating hole, the receiving space, and further through the sliding clearance.

SUMMARY OF THE INVENTION

The flow of the gas is prevented by this check valve by allowing the tip lip part of a ring-shaped valve body formed of rubber and provided at the lower surface of the insert metal to sit on a seat surface of the rod guide to close the communication between the communicating hole and the space. On the other hand, the receiving space is communicated with the reservoir by the check valve so that the working fluid from the space is returned to the reservoir, when the pressure of the oil filled within the space is increased than a certain level.

In addition, the opening and closing action of this check valve is performed synchronously with the expansion and contraction movement of the hydraulic damper. This is because, the pressure within the oil chamber of the hydraulic damper changes as the movement of the piston, and the working fluid is pushed out towards the receiving space to increase the pressure in the space, through the sliding clearance during a course that the oil chamber is being compressed.

By the way, since the lip part at the tip end of the check valve is in close contact with the seat surface of the rod guide with large area, the check valve is not easily separable from the seat surface of the rod guide according to the effect of the surface tension by the oil film, and so the check valve does not open until the pressure of the oil in the receiving space builds up to the certain level, thereby, the pressure within the space tends to increase more than required.

As the pressure in the receiving space increases, tensioning force for pressing the oil seal disposed in the inner periphery side of the insert metal to the rod is undesirably increased, which thus results in the problem that sliding resistance of the rod is increased to inhibit the smoothness of the expansion and contraction movement of the hydraulic damper.

An object of the present invention is to provide a check valve capable of opening readily with the increase of the oil pressure within the receiving space.

To achieve the object, according to the present invention, a hydraulic damper is comprised of, a cylinder, an outer cylinder disposed at outside the cylinder, an oil chamber formed inside the cylinder, a reservoir formed between the cylinder and the outer cylinder, a rod guide for closing the opening ends of the cylinder and the outer cylinder, an insert metal disposed in layer on to the rod guide, a rod penetrating freely and slidably through the rod guide and the insert metal, a receiving space formed between the rod guide and the insert metal and for temporarily retaining the working fluid leaked out from the oil chamber through the sliding clearance between the rod guide and the rod, a communicating path for communicating the reservoir and the receiving space, a check valve disposed between the receiving space and the communicating path and for allowing the flow of the working fluid only from the receiving space to the reservoir, and wherein, either one of the lip part of the check valve or the seat surface for the check valve provided on the rod guide is formed with a sealing projected part protruding from the respective contact surface.

Accordingly, the contact area of the check valve with the seat surface becomes small, thereby the adherency to the seat surface of the lip part is reduced and the check valve is readily opened with the pressure increase of the receiving space to allow the working fluid to be released to the reservoir side, therefore, it will be possible to prevent the pressure increase in the receiving space.

DETAILED DESCRIPTION OF THE PREFERRED EMBODIMENTS

The check valve of the present invention will be described below with reference to the drawings.

Figure 1:
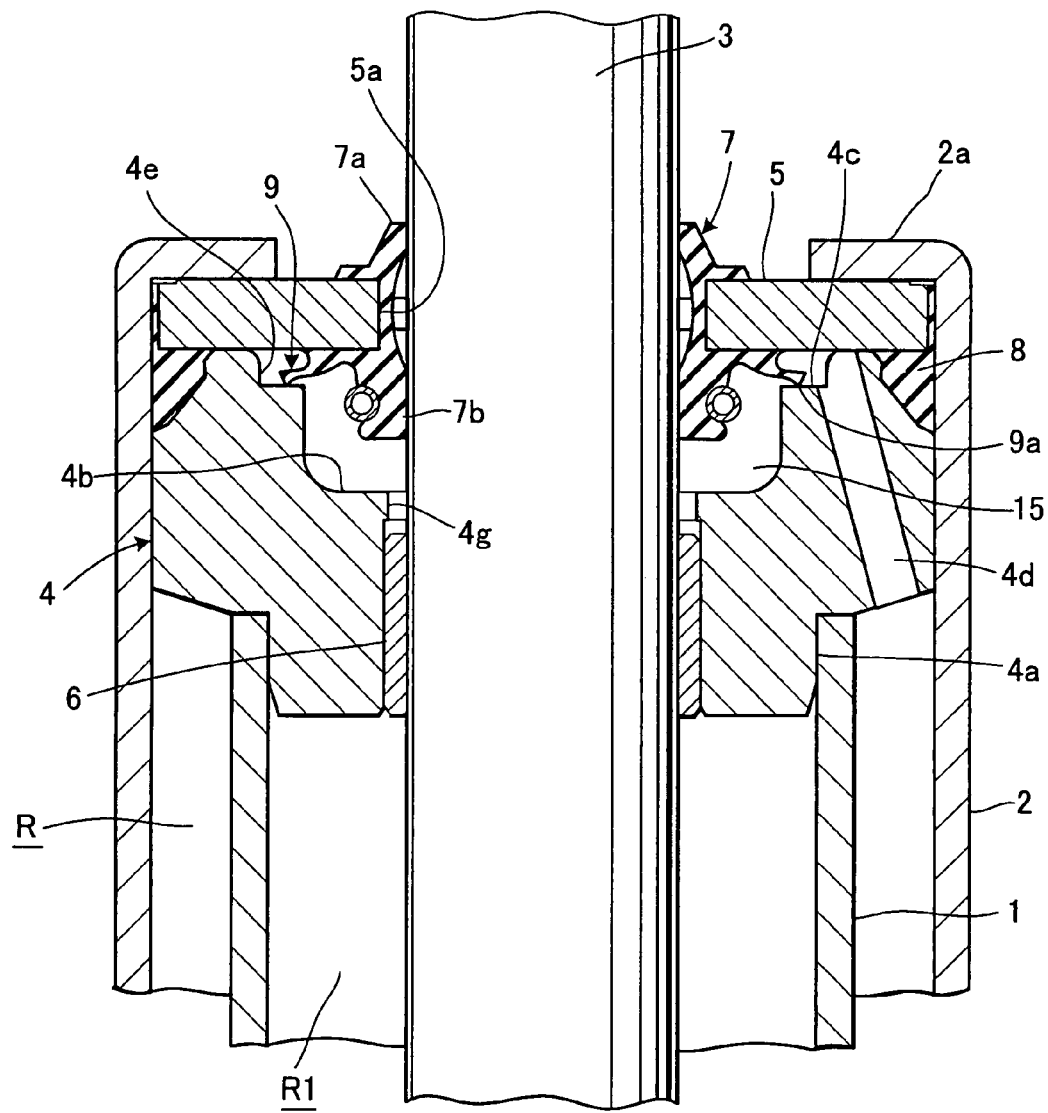
FIG. 1 is a longitudinal sectional diagram of the head part of the hydraulic damper showing the check valve of the present invention.

FIG. 1 shows a head part of a hydraulic damper provided with the check valve of the present invention. The hydraulic damper comprises a cylinder 1 and an outer cylinder 2 concentrically disposed at the outer side of the cylinder 1, and further comprises a rod guide 4 for closing the opening end of the cylinder 1 and the opening end of the outer cylinder 2 and rotatably supporting a rod 3 penetrating through the center thereof, and a ring-shaped insert metal 5 layered on this rod guide 4.

Although not illustrated, a piston linked to the rod 3 is freely and slidably inserted within the cylinder 1, and the inside of the cylinder 1 is divided by this piston into a rod side chamber R1 which is filled with the working fluid and a piston side chamber which is positioned outside the figure. Further, a reservoir R in which the gas and the working fluid is filled is formed between the cylinder 1 and the outer cylinder 2. In addition, reservoir R is communicated with the not-illustrated piston side chamber at the bottom part of the cylinder to allow the flow of the working fluid.

The rod guide 4 is formed into a ring-shape and a circular projected part 4a projecting out downward is provided in the central part of the lower surface in FIG. 1. This projected part 4a fit into the opening end of the cylinder 1 to close the upper end of the cylinder 1. Further, the outer periphery of the rod guide 4 is inserted into the opening end of the outer cylinder 2 extended upward more than the cylinder 1 to also close the upper end of the outer cylinder 2.

The tubular slide bearing 6 is mounted to the through hole 4g provided at the center of the rod guide 4, and the rod 3 is freely and slidably inserted in this slide bearing 6.

Further, in the upper surface of the rod guide 4 in FIG. 1, stepped recessed part consists of a first deeper recessed part 4b concaved in circular form centered about the through hole 4g, and a second shallower recessed part 4e concaved in circular form and having the greater diameter than the diameter of this recessed part 4b is formed. Further, a communicating hole 4d for connecting the shallower recessed part 4e and the reservoir R is formed in the rod guide 4.

The insert metal 5 layered on this rod guide 4 in FIG. 1 is formed of a ring-shaped flat plate member having a through hole 5a in the center thereof. An inner periphery seal 7 slidably contacting with the outer periphery of the rod 3, likewise an outer periphery seal 8 closely contacting with the inner periphery of the outer cylinder 2 and a check valve 9 contacting with the rod guide 4 are integrally formed to the inner periphery, the outer periphery, and further the lower surface of the insert metal 5 respectively. These inner periphery seal 7, outer periphery seal 8 and check valve 9 are formed of rubber material and the like.

In FIG. 1, the inner periphery seal 7 is provided with a dust lip 7a slidably contacting with the rod 3 at the upper side, and an oil lip 7b slidably contacting with the rod 3 at the lower side, and seals between the rod 3 and the insert metal 5. The outer periphery seal 8 seals between the insert metal 5 and the outer cylinder 2.

The insert metal 5 is fixed to the outer cylinder 2 in a state pressed against the rod guide 4 side by caulking the opening edge part 2a of the outer cylinder 2 toward the inside, thereby sealing the opening ends of the cylinder 1 and the cylinder 2 and maintaining inside of the cylinder 1 and the cylinder 2 sealed state.

A receiving space 15 for temporarily retaining the working fluid between the first recessed part 4b and the second recessed part 4e of the rod guide 4 and the lower surface of the insert metal 5 is formed between the insert metal 5 and the rod guide 4.

The working fluid which is adhered to the outer periphery of the rod 3 and passed rod guide 4 upward through the sliding clearance between the rod 3 and the slide bearing 6 during the expansion and contraction movement of the rod 3 of the hydraulic damper is scraped off by the inner periphery seal 7 and left in the receiving space 15. The inside of the receiving space 15 is filled with the working fluid by the repetitive expansion and contraction movement of the hydraulic damper.

Although it is necessary to return the thus accumulated working fluid inside the receiving space 15 to the reservoir R, if the receiving space 15 and the reservoir R are directly communicated, the gas flows from the reservoir R to the receiving space 15 reversingly, and the gas inside the receiving space 15 will be sucked into the rod side chamber R1 when the rod 3 enters to the cylinder 1. When the gas penetrates into the rod side chamber R1 in this manner, the gas is pressurized during the stroke that the chamber R is compressed and the dumping property of the hydraulic dumper is altered from the regular state.

Figure 2:
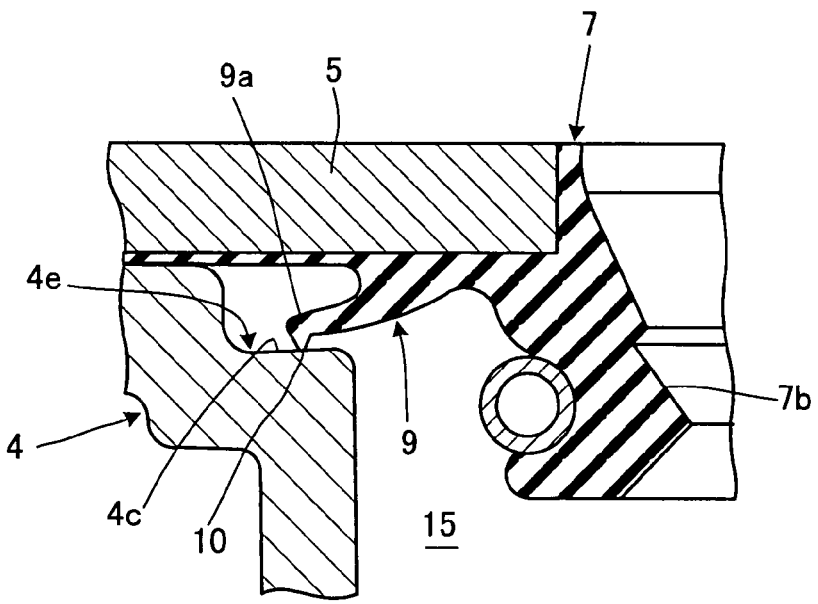
FIG. 2 is also an enlarged sectional diagram of the check valve.

To avoid this, the check valve 9 is provided to the lower surface of the insert metal 5, and as shown in FIG. 1 and FIG. 2, the receiving space 15 is partitioned from the reservoir R side by the lip part 9a at the tip end of the check valve 9 being contacted against the seat-surface 4c formed at the peripheral edge surface of the second recessed part 4e of the rod guide 4, wherein the flow of the working fluid from the receiving space 15 to the reservoir R is allowed but the reversing flow of the gas from the reservoir R to the receiving space 15 is prevented.

As mentioned above, in FIG. 1, the upper side end part of the check valve 9 is made to integral with the insert metal 5 at the lower surface thereof by bonding or the like, and integrally fixed to the insert metal 5 together with the inner periphery seal 7 and the outer periphery seal 8.

Specifically, the insert metal 5 is placed in the mold for molding the inner periphery seal 7, the outer periphery seal 8 and the check valve 9, and heated and molten material of each of the seals 7, 8 and the check valve 9 are charged into the mold and pressurized to mold each of the seals 7, 8 and the check valve 9, and at the same time, integrated to the insert metal 5. Of course, each of the seals 7, 8 and the check valve 9 may be integrated with the insert metal 5 without utilizing such a molding process.

The check valve 9, centered at the rod 3, is molded into bell mouthed-shape in which the opening part is widened, and the lip part 9a at the tip end thereof is contacted to the seat surface 4c formed on the rod guide 4 by the elastic force of itself at the position further to the inside from the communicating hole 4d.

The elastic force is generated upon deformation of the check valve 9, and the tip lip part 9a thereof is contacted to the seat surface 4c, thereby, the flow of the gas charged within the reservoir R into the receiving space 15 through the communicating hole 4d is prevented by the check valve 9, in the other way around, as the pressure within the receiving space 15 is increased with building up of the working fluid within the receiving space 15, lip part 9a is deformed upward to exhibit the function of releasing the working fluid to the reservoir R.

If the pressure within the receiving space 15 is further increased while in a state that the working fluid is fully filled in the receiving space 15, the check valve 9 is deformed and brought away from the rod guide 4 by the pressure to communicate the receiving space 15 to the communicating hole 4d thereby returning the working fluid to the reservoir R. However if the check valve 9 does not readily open, the pressure within the receiving space 15 becomes excessively high to cause such an adverse effect as described above.

If the lip part 9a of the check valve 9 is surface-contacted with the seat surface 4c at a wide ring-shaped area, the adherence of the lip part 9a is increased due to the surface tension of the working fluid exist between the respective contact surfaces, and so the lip part 9a becomes less separable from the seat surface 4c. Therefore, the pressure in the receiving space 15 inside the check valve 9 with which the check valve 9 is opened tends to be increased.

Thus, in the present invention, to reduce the adherence at the contact surface between the check valve 9 and the seat surface 4c of the rod guide 4 by reducing the respective contact area, an annular projection 10 is formed at the lower surface of the tip lip part 9a of the check valve 9 and this is used as a sealing projected part in this embodiment, as also shown in FIG. 2.

It is possible to shift the contact with the seat surface 4c when the check valve 9 is closed from the surface contact to the line contact by contacting the annular projection 10 provided to the lip part 9a of the check valve 9 to the seat surface 4c of the rod guide 4, thereby the substantial contact area is made to small without depending on the length of the slope of the lip of the check valve 9 or the overlapped length of the lip.

Figure 3:
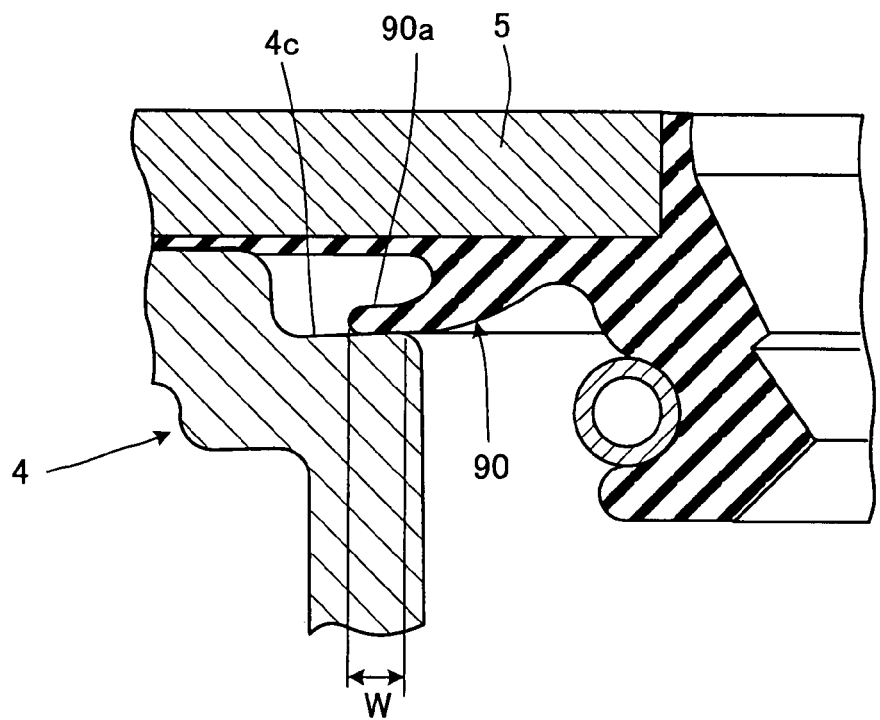
FIG. 3 is an explanatory diagram showing a contacting state between the conventional check valve and the sheeting face.

In the case of the conventional check valve 90, as shown in FIG. 3, the length of the check valve 90 is, initially, set such that the length is longer than the depth of the second recessed part 4e of the rod guide 4 to avoid a failure of the sealing function. Therefore, the check valve 90 is deformed greatly to contact the seat surface 4c at the region from the tip end inner periphery to the intermediate inner periphery of the lip part 90a thereof, which makes the contact surface thereof to a ring-shaped band shape having a certain width "w", and the contact area (sealing area) also larger.

In contrast, the check valve 9 of the present invention, as shown in FIG. 1 and FIG. 2, normally, only tip end part of the projection 10 is contacted with the seat surface 4c, thereby the contact area thereof can be made significantly smaller compared to the conventional check valve 90 shown in FIG. 3.

Further, the cross sectional shape of the tip end which is the contacting part of the projection 10 is formed into a sharpened shape to make the contact area of this projection 10 as small as possible.

In this manner, the contact area of the check valve 9 to the rod guide 4 is smaller than that of the conventional check valve 90, and the adherence to the seat surface 4c is reduced, thereby the check valve 9 is readily opened by the pressure of the working fluid within the receiving space 15.

Figure 4:
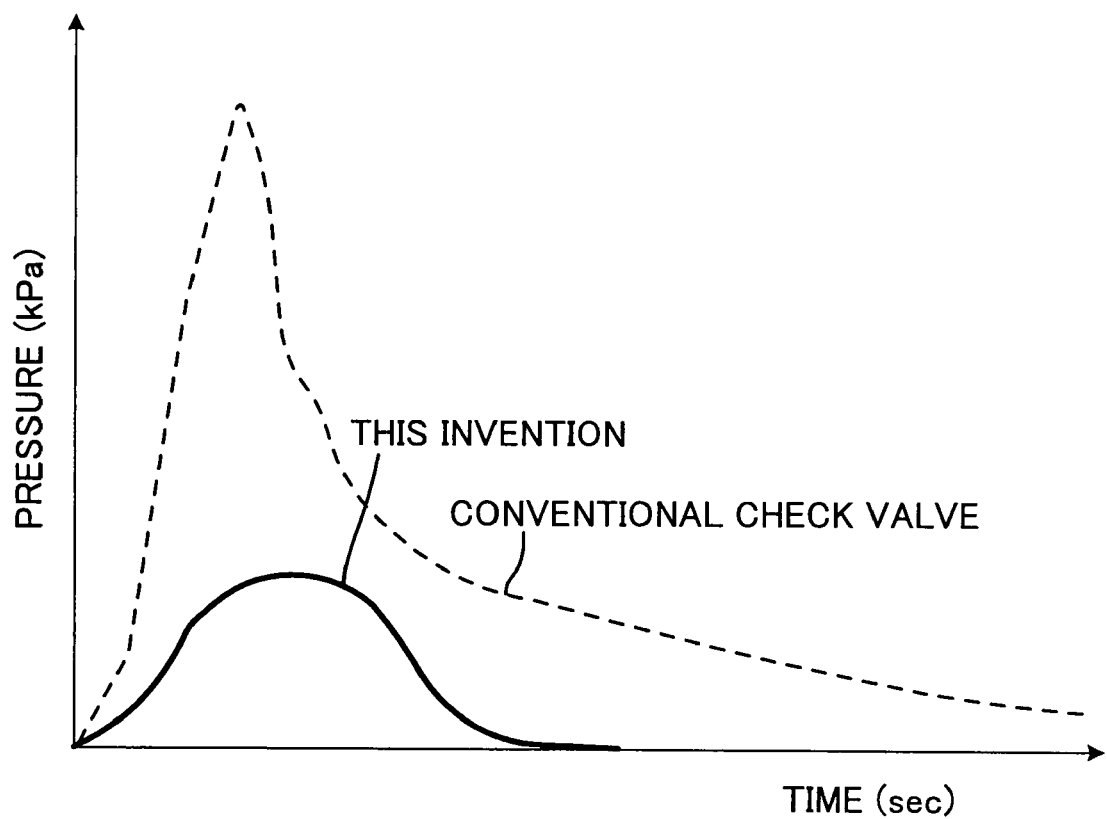
FIG. 4 is a diagram showing the change in the pressure against the time elapsed in the space during the action of the check valve.

More specifically, FIG. 4 shows the change in the pressure of the receiving space 15 when the check valve 9 is opened with comparison to that of the conventional check valve 90, and in principle, the check valves 9 and 90 repeatedly open and close every when the hydraulic damper expands and contracts.

If the rod 3 is extended upward in a state that the receiving space 15 is filled with the working fluid to compress the rod side chamber R1 and the pressure in it is increased, the working fluid is leaked out, although in very small amount, to the receiving space 15 from the sliding clearance between the slide bearing 6 and the rod 3. Therefore, the pressure in the receiving space 15 is increased instantaneously and the lip part 9a of the check valve 9 is brought away from the seat surface 4c by being pushed upward with this increase in the pressure, as a result, the working fluid flows into the reservoir R from the receiving space 15 through the communicating hole 4d.

According to the present invention, since the lip part 9a of the check valve 9 is contacted to the seat surface 4c with the projection 10 only, the adherence to the seat surface 4c is low and the lip part 9a can be bought away from the seat surface 4c of the second recessed part 4e with only a small pressure increase in the receiving space 15, and so, as shown in FIG. 4, it will be possible to release the working fluid by communicating the receiving space 15 and the reservoir R at the earlier timing than the conventional check valve 90 to prevent the pressure increase of the receiving space 15.

In addition, in FIG. 4, continuous line shows the pressure change within the receiving space 15 against time with the check valve 9 of the present invention, and the broken line shows the pressure change within the receiving space 15 against time with the conventional check valve 90.

Thus, according to the check valve structure of the present invention, the pressure increase within the receiving space 15 can be prevented and so the sliding property of the rod 3 can be maintained in good condition at all the time.

When the pressure of the receiving space 15 is increased, the oil lip 7b of the inner periphery seal 7 provided to the inner periphery side of the insert metal 5 is pressed hard to the rod 3 to increase the tensioning force of the oil lip 7b, which in turn increases the sliding resistance instantaneously between the rod 3 and the oil lip 7b. As a result, the sliding resistance of the rod 3 is increased synchronously with the expansion and contraction movement of the rod 3 and the sliding property of the rod 3 is deteriorated. When the sliding property of the rod 3 is deteriorated in this manner, the expansion and contraction movement of the hydraulic damper becomes not smooth, and consequently, a vibration absorbing property and a dumping property of the vehicle will be spoiled.

Figure 5:
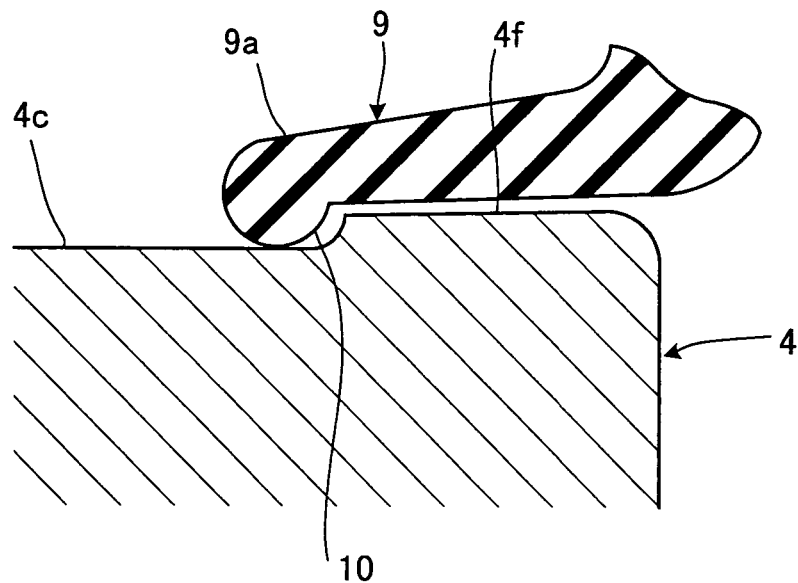
FIG. 5 is a sectional diagram of the check valve of the further embodiment.

Next, a description is given to another embodiment shown in FIG. 5.

In this embodiment, a circular stepped part 4f of a certain height is provided on the seat surface 4c of the rod guide 4 at the position further to the inner periphery side from the annular projection 10 provided to the lip part 9a of the check valve 9.

The height of the stepped part 4f from the seat surface 4c is lower than the height of the projection 10 such that, in the normal state, the lower surface of the lip part 9a does not contact with the stepped part 4f. The step riser surface of the circular stepped part 4f is in the form of curved surface along the shape of the side surface of the projection 10 of the lip part 9a.

As to the remaining constructions, the detailed descriptions of the identical members in the first embodiment are omitted as the explanations will overlap, and only the identical numerical figures are designated.

The check valve 9 is, normally, in contact with the seat surface 4c only with the projection 10 of the lip part 9a. Thereby, when the pressure of the receiving space 15 inside the check valve 9 is increased, the lip part 9a is readily separated from the seat surface 4c to allow the working fluid to be released to the reservoir R and inhibit the pressure increase of the receiving space 15.

On the other hand, although the check valve 9 tends to be reflexed to the inner periphery side toward the receiving space 15 when high gas pressure is applied from the reservoir R side, the projection 10 of the lip part 9a is caught by the step riser surface of the stepped part 4f and the reflex to the inner periphery side is prevented. At the same time, the lower surface of the lip part 9a is in close contact with the stepped part 4f over wide area, securely closed state can be maintained with the check valve 9 even when the gas pressure from the reservoir R is applied.

As a result, the check valve 9 is promptly opened when the pressure increase of the working fluid of the receiving space 15 occurs so that the working fluid is released from the receiving space 15 to the reservoir R, and at the same time, the lip part 9a is prevented from being reflexed when the high gas pressure is applied from the reservoir R, so that the reverse flow of the gas from the reservoir R into the receiving space 15 can be surely prevented.

In addition, although the case where the seat surface 4c and the stepped part 4f formed to the rod guide 4 are horizontal, in this embodiment, these may be formed to an inclined surface or a vertical and correspondingly to these, the lip part 9a of the check valve 9 may be formed to be inclined or vertical.

Figure 6:
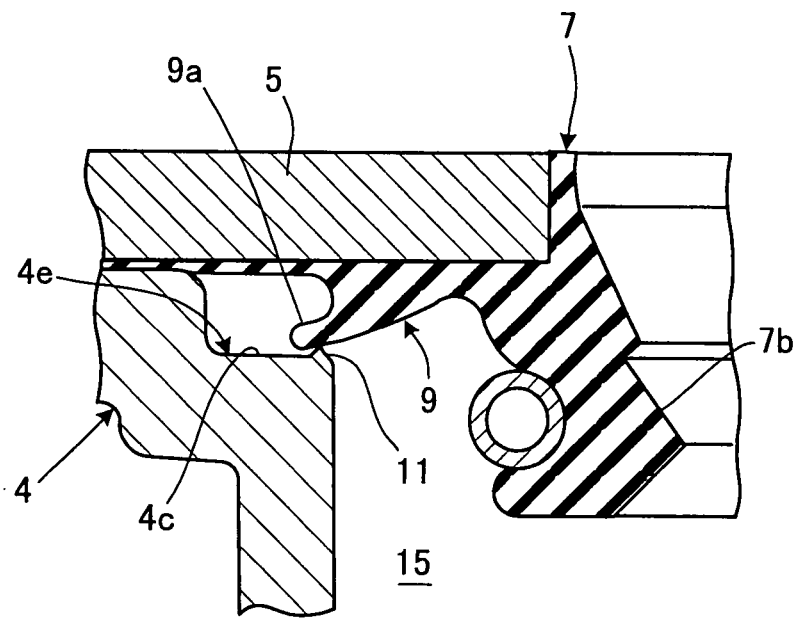
FIG. 6 is a sectional diagram of the check valve of the still further embodiment.

Next, a description is given to another embodiment shown in FIG. 6.

In this embodiment, as the sealing projected part, an annular projection 11 protruding from the seat surface 4c centering the rod 3 is provided on the seat surface 4c of the second recessed part 4e of the rod guide 4 in place of providing the projection 10 on the lip part 9a at the tip end of the check valve 9.

This annular projection 11 is formed on the seat surface 4c in ring-shape at the position where the lip part 9a at the tip end of the check valve 9 is in contact against, and the tip end of the projection 11 is formed into a sharp tip end in the cross-section thereof such that the contact area is as small as possible.

In addition, as to the remaining constructions, the detailed descriptions of the identical members in the first embodiment are omitted as the explanations will overlap, and only the identical numerical figures are designated.

In this embodiment, the contact area between the check valve 9 and the rod guide 4 is reduced by contacting the lip part 9a of the check valve 9 to the annular projection 11 provided on the seat surface 4c of the rod guide 4.

Since only tip end part of the projection 11 of the seat surface 4c is contacted with the check valve 9, the contact area becomes significantly smaller compared to the conventional check valve and the lip part 9a does not stick to the seat surface 4c by the surface tension, thereby it will be possible to open the check valve 9 in the state with much smaller pressure increase of the receiving space 15.

Therefore, according to the check valve structure of this embodiment, the pressure increase within the receiving space 15 can be inhibited, and thereby, the oil lip 7b of the inner periphery seal 7 provided on the inner periphery side of the insert metal 5 can be prevented from undesirably increasing the tensioning force to the rod 3 and smooth expansion and contraction movement of the hydraulic damper can be realized without increasing the sliding resistance between the rod 3 and the oil lip 7b.

By the way, in each of the embodiment, the actual contact area between the check valve 9 and the seat surface 4c of the rod guide 4 can further be reduced by making the contact surfaces of either or both of the check valve 9 or the lip part 9a and the seat surface 4c rougher (coarse surface) compared to the other part.

In this manner, the adherence between the check valve 9 and the seat surface 4c is weakened and the check valve 9 becomes easier to be opened, thereby the receiving space 15 can be communicated with the reservoir R with less pressure.

In this manner, the check valve 9 becomes still easier to be opened, thereby the pressure increase within the receiving space 15 can be prevented and the expansion and contraction movement of the hydraulic damper can be smoothed.

In addition, the scope of the present invention is not limited by the illustrated or described detailed embodiments themselves.

What is claimed is:

1. A hydraulic damper comprising:
a cylinder;
an outer cylinder disposed outside the cylinder;
an oil chamber formed inside the cylinder;
a reservoir formed between the cylinder and the outer cylinder;
a rod guide for closing opening ends of the cylinder and the outer cylinder;
an insert metal disposed in a layer on the rod guide;
a rod penetrating freely and slidably through the rod guide and the insert metal;
a receiving space formed between the rod guide and the insert metal, for temporarily retaining a working fluid leaked out from the oil chamber through a sliding clearance between the rod guide and the rod;
a communicating path for communicating the reservoir and the receiving space; and
a check valve disposed between the receiving space and the communicating path, for allowing a flow of the working fluid only from the receiving space to the reservoir;
wherein a lip part of the check valve is formed with an annular projection as a sealing projected part which protrudes from a contact surface toward a seat surface for the check valve provided on the rod guide; and
wherein a circular stepped part of a certain height but lower than the projection is further formed on the seat surface at a position further to an inner periphery side from the annular projection provided on the lip part.

2. The hydraulic damper according to claim 1, wherein the check valve is provided integrally with a lower surface of the insert metal, formed of a bell-mouthed annular elastic body centered about the rod, and formed with the lip part at a tip end thereof, and wherein the seat surface is positioned around the rod and formed as a peripheral edge of a stepped recessed part provided to the rod guide.

3. The hydraulic damper according to claim 1, wherein a cross-section of a tip end of the annular projection is formed to a sharpened shape.

4. The hydraulic damper according to claim 1, wherein a surface of at least one of the lip part or the seat surface where the lip part and the seat surface contact is rougher compared to another part, respectively, of the lip part or the seat surface.

5. A hydraulic damper comprising:
a cylinder;
an outer cylinder disposed outside the cylinder;
an oil chamber formed inside the cylinder;
a reservoir formed between the cylinder and the outer cylinder;
a rod guide for closing opening ends of the cylinder and the outer cylinder;
an insert metal disposed in a layer on the rod guide;
a rod penetrating freely and slidably through the rod guide and the insert metal;
a receiving space formed between the rod guide and the insert metal, for temporarily retaining a working fluid leaked out from the oil chamber through a sliding clearance between the rod guide and the rod;
a communicating path for communicating between the reservoir and the receiving space; and
a check valve disposed between the receiving space and the communicating path, for allowing a flow of the working fluid only from the receiving space to the reservoir;
wherein a seat surface for the check valve provided on the rod guide is formed with an annular projection as a sealing projected part which protrudes from a contact surface toward a lip part of the check valve.

6. The hydraulic damper according to claim 5, wherein the check valve is provided integrally with a lower surface of the insert metal, formed of a bell-mouthed annular elastic body centered about the rod, and formed with the lip part at a tip end thereof, and wherein the seat surface is positioned around the rod and formed as a peripheral edge of a stepped recessed part provided to the rod guide.

7. The hydraulic damper according to claim 5, wherein a cross-section of a tip end of the annular projection is formed to a sharpened shape.

8. The hydraulic damper according to claim 5, wherein a surface of at least one of the lip part or the seat surface where the lip part and the seat surface contact is rougher compared to another part, respectively, of the lip part or the seat surface.

* * * * *